(12) United States Patent
Liu

(10) Patent No.: US 12,403,377 B2
(45) Date of Patent: Sep. 2, 2025

(54) FITNESS COACHING METHOD, SYSTEM AND TERMINAL

(71) Applicant: Astral IP Enterprise Ltd., Vancouver (CA)

(72) Inventor: Daihua Liu, Vancouver (CA)

(73) Assignee: Astral IP Enterprise Ltd., Vancouver (CA)

( * ) Notice: Subject to any disclaimer, the term of this patent is extended or adjusted under 35 U.S.C. 154(b) by 0 days.

(21) Appl. No.: 17/964,950

(22) Filed: Oct. 13, 2022

(65) Prior Publication Data

US 2024/0123317 A1   Apr. 18, 2024

(51) Int. Cl.
| | |
|---|---|
| *A63B 71/06* | (2006.01) |
| *A63B 24/00* | (2006.01) |
| *G06V 10/94* | (2022.01) |
| *G06V 40/20* | (2022.01) |

(52) U.S. Cl.
CPC ...... *A63B 71/0622* (2013.01); *A63B 24/0075* (2013.01); *A63B 2071/0625* (2013.01); *A63B 2071/065* (2013.01); *A63B 2214/00* (2020.08); *G06V 10/945* (2022.01); *G06V 40/23* (2022.01)

(58) Field of Classification Search
CPC ............ A63B 71/0622; A63B 24/0075; A63B 2071/0625; A63B 2071/065; A63B 2214/00; G06V 10/945; G06V 40/23
See application file for complete search history.

(56) References Cited

U.S. PATENT DOCUMENTS

| | | | |
|---|---|---|---|
| 6,336,891 B1 * | 1/2002 | Fedrigon | A63B 24/0006 482/4 |
| 9,880,805 B1 * | 1/2018 | Guralnick | G06F 3/0482 |
| 11,406,873 B2 * | 8/2022 | Hand | G16H 40/63 |
| 2007/0221045 A1 * | 9/2007 | Terauchi | G11B 27/329 |
| 2011/0311955 A1 * | 12/2011 | Forsten | G10H 1/40 434/247 |
| 2013/0089845 A1 * | 4/2013 | Hutchison | G09B 19/003 434/257 |
| 2014/0087341 A1 * | 3/2014 | Hall | A63B 71/0622 434/258 |
| 2015/0142147 A1 * | 5/2015 | Stanghed | G06F 16/683 700/94 |
| 2015/0220523 A1 * | 8/2015 | Lagree | G06F 16/951 707/752 |
| 2016/0343410 A1 * | 11/2016 | Smith | G11B 27/28 |

(Continued)

*Primary Examiner* — Jack Yip
(74) *Attorney, Agent, or Firm* — Bayramoglu Law Offices LLC

(57) ABSTRACT

A fitness coaching method, system and terminal are provided. The fitness coaching method includes the following steps: acquiring first option data of a user; retrieving a demonstrative video, and reading VideoSpeedData in the fitness coaching system according to a unique identifier of the demonstrative video to obtain a set playback speed; playing the demonstrative video, and generating synchronous count text and speech by a Text to Speech (TTS) module; acquiring second option data of the user, tuning the set playback speed, packaging to obtain a latest VideoSpeedData to be stored in SharedPreferences of the fitness coaching system, wherein a tuned playback speed is used as the set playback speed corresponding to the demonstrative video when the demonstrative video is selected a next time.

16 Claims, 11 Drawing Sheets

(56) References Cited

U.S. PATENT DOCUMENTS

2017/0239550 A1* 8/2017 Fernando ............ A63B 21/4034
2021/0342952 A1* 11/2021 Putnam .............. A63B 71/0622
2022/0016484 A1* 1/2022 Bissonnette ....... A63B 24/0062

* cited by examiner

FITNESS COACHING METHOD, SYSTEM AND TERMINAL

TECHNICAL FIELD

The present invention belongs to the technical field of mobile communication, and particularly relates to a fitness coaching method, system and terminal.

BACKGROUND

Nowadays, with the development of the times and the continuous improvement of living standards, people pay more and more attention to physical health, and many people have begun to participate in fitness sports. Besides, with the development and innovation of smart devices and related technologies, more and more fitness Apps can be downloaded and installed on smart devices and as fitness coaches to teach people to get reasonable and effective exercise at home. This is a way of more free and flexible to exercise.

At present, most fitness applications can intelligently recommend exercise courses to users based on their own conditions (such as age, body type) and fitness goals (such as weight loss, muscle gain, and shape). The courses can include corresponding text, pictures, Video to guide users to exercise in all directions.

However, the existing fitness applications have at least the following shortcomings:
1) The speed of displaying the content of the courses for workout moves (such as videos, count text, speech) is mostly not adjustable; or it needs multiple steps to do the tunning, resulting in poor user experience and low user stickiness.
2) The fitness course are displayed in a single form, and the users do not have many choices.

SUMMARY

In order to solve at least one of the technical problems, the present invention provides a fitness coaching method, System and terminal.

In a first aspect, the present invention discloses a fitness coaching method which is provided via a user intelligent terminal, including providing a fitness coaching system which is available for downloading to be installed in the user intelligent terminal, and performing the following steps for processing, by the fitness coaching system, according to user interaction instructions:

S101, acquiring first option data selected by a user for a workout move;

S103, in response to the first option data selected by the user, retrieving a corresponding demonstrative video and reading VideoSpeedData in the fitness coaching system according to an unique identifier of the demonstrative video to obtain a set playback speed of the demonstrative video;

S105, playing the retrieved demonstrative video at the set playback speed, and simultaneously generating count text and speech in synchronization with the set playback speed by a TTS (text-to-speech) module of the fitness coaching system;

S107, judging whether second option data selected by the user for the set playback speed of the demonstrative video being played is acquired or not, and if yes, going to step S109; and S109, in response to the second option data, tuning the set playback speed of the demonstrative video being played, and packaging the tuned playback speed and the unique identifier of the demonstrative video as VideoSpeedData to be stored in SharedPreferences in the fitness coaching system and overwriting the previous VideoSpeedData such that the tuned playback speed is to be used as the set playback speed corresponding to the demonstrative video when the demonstrative video is selected the next time.

According to at least one embodiment of the invention, prior to the step of acquiring first option data selected by a user for a workout move, the method further includes the following steps:

S10, acquiring user basic data; and

S11, performing matching according to the user basic data to obtain a corresponding training intensity level, wherein each intensity level associates with a daily recommended workout routine, and each daily recommended workout routine includes at least one candidate workout move, wherein the workout move is one selected from the candidate workout moves.

According to at least one embodiment of the invention, the demonstrative video includes data of both a cartoon character demonstrative video and a human image video matching with the workout move, wherein after step S105, the method further includes the following steps:

S1011, judging whether third option data selected by the user for a video type of the demonstrative video being played is acquired or not; if so, going to step S1013; and if not, going to step S1015;

S1013, in response to the third option data, jumping to the selected video type, wherein the third option data indicates whether it is selected to jump from playing the cartoon character demonstrative video to playing the human image video, or jump back from playing the human image video to playing cartoon character demonstrative video; and S1015, playing the cartoon character demonstrative video by default.

According to at least one embodiment of the present invention, the demonstrative video of the workout move has an initial playback speed, and in the second option data, available options for the set playback speed include 0.5, 0.6, 0.7, 0.8, 0.9, 1.0, 1.1, 1.2, 1.3, 1.4, 1.5, 2, 2.5, 3, 3.5 and 4 times the initial playback speed.

In a second aspect, the present invention further discloses a fitness coaching system applicable to a terminal device, and the fitness coaching system includes:

a first data acquisition module for acquiring first option data selected by a user for a workout move;

a workout move data retrieving module for, in response to the first option data selected by the user, retrieving a demonstrative video in the system and reading VideoSpeedData in the system according to an unique identifier of the demonstrative video to obtain a set playback speed of the demonstrative video;

a second data acquisition module for acquiring second option data selected by the user for the set playback speed of the demonstrative video;

a playback speed tuning module for, in response to the second option data, tuning the set playback speed of the demonstrative video being played;

a synchronization module for generating, by a TTS module of the fitness coaching system, count text and speech in synchronization with the set playback speed;

a packaging module for, once the set playback speed of the demonstrative video of any workout move is tuned, packaging the tuned playback speed and the unique identifier of the demonstrative video as VideoSpeedData to be stored in SharedPreferences and overwriting the previous VideoSpeedData such that the tuned playback speed is to be used as the set playback speed corresponding to the demonstrative video when the demonstrative video is selected the next time; and a playing module for playing the retrieved demonstrative video at the set playback speed, and the synchronous count text and speech.

According to at least one embodiment of the invention, the demonstrative video includes data of both a cartoon character demonstrative video and a human image video matching with the workout move, and the fitness coaching system further includes:

a third data acquisition module for acquiring third option data selected by the user for a video type of the demonstrative video being played, wherein the third option data indicates whether it is selected to jump from playing the cartoon character demonstrative video to playing the human image video, or jump back from playing the human image video to playing cartoon character demonstrative video; and a video type switching module for, in response to the third option data, jumping to the selected video type, and for setting the cartoon demonstrative video as a default video type for playback when the third option data is not acquired.

According to at least one embodiment of the invention, the fitness coaching system further includes:

a fourth data acquisition module for acquiring user basic data;

an intensity level matching module for performing matching according to the user basic data to obtain a corresponding training intensity level, wherein each intensity level associates with a recommended workout routine, and each recommended workout routine includes at least one workout move.

According to at least one embodiment of the invention, the fitness coaching system further includes:

a workout move database for storing demonstrative videos of various workout moves, wherein the workout move data retrieving module retrieves the demonstrative video matching with the selected workout move from the workout move database.

According to at least one embodiment of the present invention, the demonstrative video of the workout move has an initial playback speed, and in the second option data, available options for the set playback speed include 0.5, 0.6, 0.7, 0.8, 0.9, 1.0, 1.1, 1.2, 1.3, 1.4, 1.5, 2, 2.5, 3, 3.5 and 4 times the initial playback speed.

In a third aspect, the present invention further discloses a fitness coaching terminal including a display device, an input device, a processor, and a memory having any fitness coaching system of the second aspect stored therein;

the display device is used for displaying an interactive interface of the fitness coaching system;

the input device is used for receiving an operation gesture of the user on the fitness coaching system;

the processor is used for executing the fitness coaching system, responding to the operation gesture received by the input device, and generating a corresponding interactive interface displayed in the display device;

the interactive interface includes:

a first-time startup interface for collecting user basic data;

a first interface for listing options of recommended workout routines associating with the training intensity level matching with the user basic data;

a second interface for listing options of the workout moves included in the recommended workout routine selected by the user;

a third interface including a first workout move playing area, a playback speed tunning trigger area, and a dynamic count text area independent of the first workout move playing area, wherein the first workout move playing area is used for playing the demonstrative video and the content of the speech of the workout move selected by the user, wherein the content of the speech contains information about the number of repetitions of the workout move in the demonstrative animation;

the dynamic count text area is used for dynamically displaying the number of completed repetitions of the workout move has been done in the demonstrative video in a form of count text;

the playback speed tuning trigger area is used for displaying a playback speed tuning trigger button and the current playback speed; and when the playback speed tuning trigger button is triggered, it is switched to a fourth interface;

the fourth interface includes a second workout move playing area and a playback speed tuning area;

the playback speed tuning area is used for displaying a playback speed tuning selection button and playback speed options;

once any playback speed option is selected by the user, it is switched back to the third interface, and the selected playback speed option enables the playback speed of the first workout move playing area to be tuned to a target speed, and enables a frequency of counting in the corresponding dynamic count text area and a speaking speed of the speech to vary synchronously.

According to at least one embodiment of the invention, the operation gesture received by the input device includes:

a first gesture for selecting a corresponding daily recommended workout routine in the first interface, and entering the second interface;

a second gesture for selecting a corresponding workout move in the second interface as the workout move, and entering the third interface;

a third gesture for triggering the playback speed tunning trigger button in the third interface, and entering the fourth interface; and a fourth gesture for selecting a corresponding playback speed option button in the fourth interface and returning to the third interface after selection is confirmed.

According to at least one embodiment of the invention, the third interface further includes a video type selection trigger area for displaying a playing mode selection trigger button;

the interactive interface of the display device further includes:

a fifth interface including a video type option area and a third workout move playing area, wherein the video type option area is used for displaying a cartoon video button and a human video button, and the third workout move playing area is used for, according to a selection gesture received in the video type option area, displaying the demonstrative video and the content of the speech of the corresponding video type;

a fifth gesture for triggering a video type selection trigger button in the third interface, and entering the fifth interface; and a sixth gesture for triggering an animation playing button or a video data button in the fifth interface so as to switch to the corresponding video type.

The present invention has at least the following advantages:

According to the fitness coaching method, device and terminal of the present invention, for a workout move, the user can simultaneously tune both the playback speed of the demonstrative video and the frequency of counting in the dynamic count text display area independent of the demonstrative video playing area and the speaking speed of the speech, so that the operation is facilitated, and the user can conveniently tune the demonstrative video, the frequency of counting of the count text and the speaking speed of the speech to be more suitable for the frequency of movement of the user so as to keep up with the speed of demonstration, and does not need to count by him/herself, thereby achieving easier and more user-friendly operation; what's more, if the playback speed of the animation data in any workout move is tuned or reselected, the tuned or reselected playback speed is set to the playback speed of the animation data when selected next time; therefore, the need for individuation can be met, the playback speed of the demonstrative video, the count text frequency and the voice playback speed of each workout move are adjusted to be matched with the action frequency of the current stage of each workout move, the fitness coaching application can be trained after subsequent opening, the speed adjustment does not need to be carried out every time, the operation is reduced, and the use experience is greatly improved.

DETAILED DESCRIPTION OF THE EMBODIMENTS

In order that those skilled in the art may better understand the present invention, technical solutions in the embodiments of the present invention will be described clearly and completely with reference to the accompanying drawings in the embodiments of the present invention. It is to be understood that the described embodiments are merely illustrative of some, but not all embodiments of the invention. Based on the embodiments of the present invention, all other embodiments obtained by those skilled in the art without involving any inventive effort are intended to be within the scope of the present invention.

The terms "first", "second", and the like in the description and claims of the present invention and in the above drawings, if any, are used for distinguishing between similar objects and not necessarily for describing a particular order or sequential order. It is to be understood that the data so used are interchangeable under appropriate circumstances such that the embodiments described herein can be implemented in an order other than that illustrated or described herein. Furthermore, the terms "includes", and "has", as well as any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus.

Figure 1:
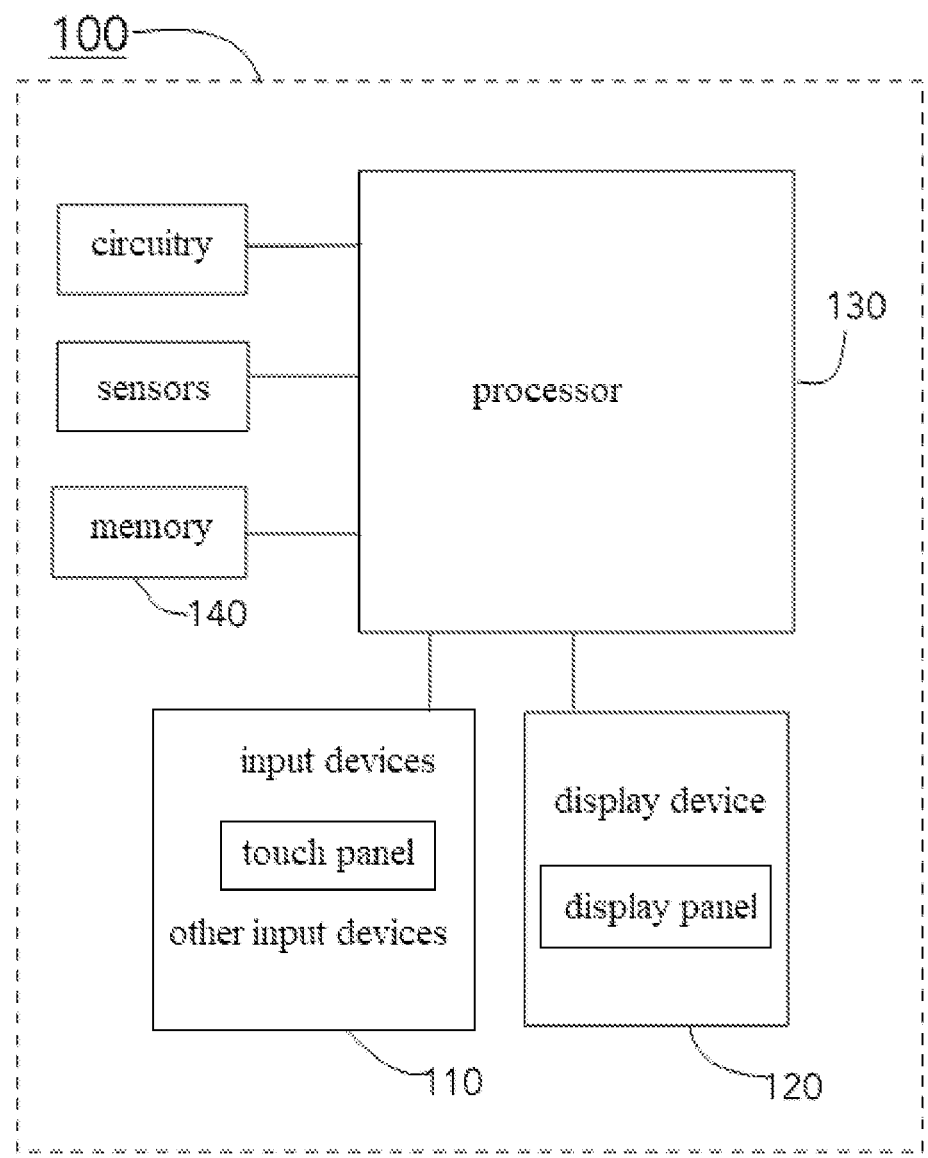
FIG. 1 shows a schematic diagram illustrating configuration of a fitness coaching terminal according to an embodiment of the present invention.

In addition, in the present invention, the terminal 100 involved may be a mobile phone, a tablet computer, a vehicle-mounted computer, and the like. It typically includes RF (Radio Frequency) circuitry, memory, input devices, display devices, sensors, audio circuitry, WiFi (Wireless Fidelity) modules, processors, and power supplies. Those skilled in the art will appreciate that, the structure of the terminal shown in FIG. 1 is merely an example only and is not intended to be limiting of the terminal, and may include more or fewer components than shown, or combinations of certain components, or different arrangements of components.

Among other things, the memory 140 may be used to store software programs and modules, and the processor 130 performs various functional applications and data processing of the terminal by executing the software programs and modules stored in the memory 140. The memory 140 may mainly include a program storage area and a data storage area, wherein the program storage area may store an operation system, an application program (a fitness coaching software program) required for at least one function, etc.; and the data storage area may store data created according to the use of the terminal, such as user condition data, intensity matching template data, workout move video data, etc. In addition, the memory 140 may include high speed random access memory, and may also include non-volatile memory, such as at least one magnetic disk storage device, flash memory device, or other volatile solid state memory device.

The display device 120 may be used to display information input by a user or information provided to the user, and various menus of the terminal. The display device 120 may include a display panel. Furthermore, the display panel may be a touch panel, and upon detection of a touch operation on or near the touch panel, the touch panel transmits the touch operation to the processor 130 to determine the type of the touch event, and then the processor 130 provides corresponding visual output on the display panel according to the type of the touch event. Although in FIG. 1, the input device and the display device are implemented as two separate components to provide the input and display functions of the terminal, in most current embodiments, the touch panel and the display panel are integrated to provide the input and display functions of the terminal, for example, the touch panel and the display panel are integrated into a touch screen to provide the input and display functions of the terminal. These are well established techniques in the art.

The processor 130, as the center of control of the terminal 100, is connected to various parts of the whole terminal via various interfaces and lines, and performs various functions and processes data by running or executing software programs and/or modules stored in the memory 140, and calling data stored in the memory 140, thereby achieving overall monitoring of the terminal.

A Text-to-speech (TTS) systems, also known as a speech computer or speech synthesizer, may be implemented in software or hardware products. It consists of two parts: a front end and a rear end. The front end converts the original text of symbols into words equivalent to the output. This process is usually called text normalization, preprocessing, or tokenization. The front end then assigns speech transcription to each word, and divides and marks the text into prosodic units, such as phrases, clauses, and sentences. The process of assigning phonetic symbols to words is called text to phoneme or letter to phoneme conversion. The phonetic symbols and prosodic information together constitute the symbolic language representation of the output of the front end. The back end, often referred to as a synthesizer, converts the symbolic language representation into sound. In some systems, this part involves computing the target rhythm (pitch contour, phoneme duration) and then adding it to the output speech.

SharedPreferences is a lightweight storage class on the Android platform that saves some common configurations of applications.

Figure 2:
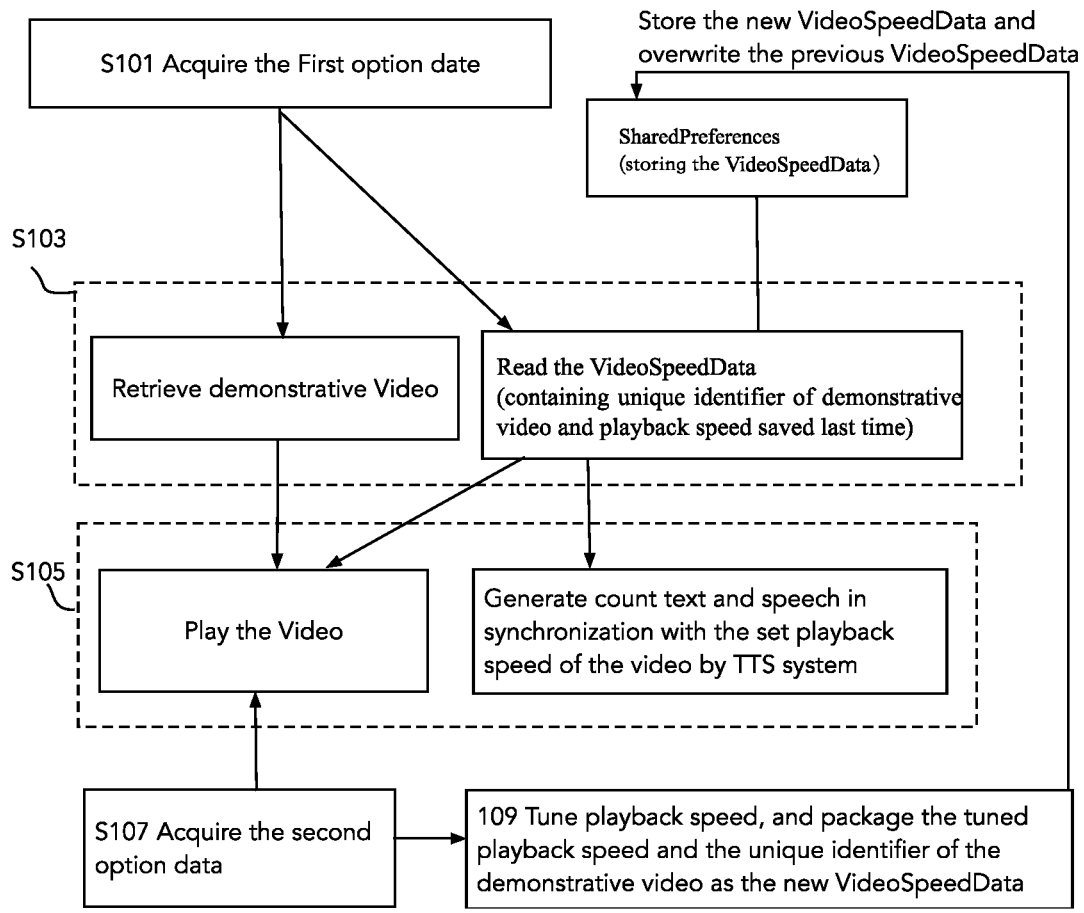
FIG. 2 shows a flowchart of a fitness coaching method according to an embodiment of the present invention.

In a first aspect, an embodiment of the present invention provides a method for providing fitness coaching via a user intelligent terminal, wherein the fitness coaching method includes providing a fitness application program which is available for downloading to be installed in the user intelligent terminal, and includes the following steps for processing according to user instructions, as shown in FIG. 2:

S101, first option data selected by a user for a workout move is acquired.

When a user opens an application program (APP) installed in an intelligent terminal (such as a mobile phone) and enters a workout move selection interface (i.e. a second interface 320 described later), at least one corresponding workout move option is displayed on the intelligent terminal, for example, a plank option, a jumping jacks option, a dumbbell Russian twist option, etc., and the workout move option can be displayed in the form of text, images or combination of text and images. At this time, the user can select a workout move option of interest in the workout move selection interface by means of, for example, a mouse or a touch screen, i.e. the step of acquiring the first option data of the user. Then, it enters a corresponding workout move playing interface (i.e., a third interface 330 described later).

S103, in response to the first option data selected by the user, a corresponding demonstrative video is retrieved, and VideoSpeedData in the fitness coaching system is read according to an unique identifier of the demonstrative video to obtain a set playback speed of the demonstrative video.

For each workout move, there is demonstrative video data (such as cartoon character demonstrative video data or recorded human video data) of the workout move, which can be independently retrieved, stored in the file of the fitness application program. It will be appreciated that the demonstrative data may be pre-stored in a memory 140 of the terminal device 100, or the data may be downloaded by the user from a corresponding server in an off-line cache manner and stored in the memory 140 of the corresponding terminal device 100 to facilitate retrieval. In addition, it is also available for the user for online transmission (i.e. online playback) via a communication network (3G, 4G, 5G, wifi, etc.).

S105, the retrieved demonstrative video is played at the set playback speed, and count text and speech is simultaneously generated in synchronization with the set playback speed by a TTS module (i.e. a TTSsystem) of the fitness coaching system.

When the demonstrative video of any workout move is selected for the first time, the demonstrative video is played at an initial playback speed set in the application; and when the demonstrative video of any selected workout move is not selected for the first time, the demonstrative video is played at the set playback speed that the user selected the last time.

S107, whether second option data selected by the user for the set playback speed of the demonstrative video being played is acquired or not is judged, wherein the second option data refers to a set playback speed option of the demonstrative video; and if yes, go to step S109.

It should be noted that both the afore-mentioned initial playback speed and the set playback speed option herein can be appropriately set according to the actual test result. In a preferred embodiment of the present invention, the initial set playback speed is preferably defined as a 1× playback speed, and the second option data for user selection is N times the initial playback speed, wherein N may be one selected from group consisting of 0.5, 0.6, 0.7, 0.8, 0.9, 1.0, 1.1, 1.2, 1.3, 1.4, 1.5, 2, 2.5, 3, 3.5, or 4.

S109, the set playback speed of the demonstrative video being played is tuned, and the tuned playback speed and the unique identifier of the demonstrative video are packaged as VideoSpeedData to be stored in SharedPreferences in the fitness coaching system and overwriting the previous VideoSpeedData such that the tuned playback speed is to be used as the set playback speed corresponding to the demonstrative video when the demonstrative video is selected the next time.

It will be appreciated that in this embodiment, the dynamic count text and the speech are generated by the TTS module in the pre-set playback device, and the rate pf counting of the dynamic count text and the speaking speed of the speech generated in the TTS module vary synchronously while the demonstrative video of any workout move is played at the initial playback speed or at the tuned set playback speed.

It should be noted that in step S107, if the second option data is not acquired, the demonstrative video playing will be played at the speed in the step S105 all the time; and the embodiment shown in FIG. 2 is illustrated with the steps as the second option data is acquired as an example.

In step S105, the unique function of the fitness application program is used, namely when the playback speed of the demonstrative video is tuned, not only is the speed of playing the video tuned, but also the frequency of counting of the count text displayed in the dynamic count text area and the speaking speed of the corresponding speech vary along with it so as to be displayed in synchronization with the number of completed repetitions of the workout move in the demonstrative video, so that the user can adjust the rhythm of counting to be better suitable the frequency of the movement the user, thereby achieving user-friendly operation.

In addition, in step S103 of the invention, the speed takes effect as follows:

after the user selects to enter the corresponding workout move interface, the program reads SharedPreferences according to the unique identifier of the workout move to find the video speed of the current workout move (i.e. the afore-mentioned set playback speed), and sets the speed to a preset playback device (e.g. a customized playback control ExercisePlayView), thereby changing the playback speed of the video.

In summary, according to the fitness coaching method, when the user adjusts the playback speed of the demonstrative video for a selected workout move, the frequency of counting of the dynamic count text and the speaking speed of the speech can be triggered to vary at the same time, so that after the user adjusts the frequency of counting to adapt to the rhythm of movement of the user, the user does not need to count the number of movements by him/herself, and the demonstrative video is more consistent with the move speed of the user, thereby achieving a more user-friendly training process.

Figure 3:
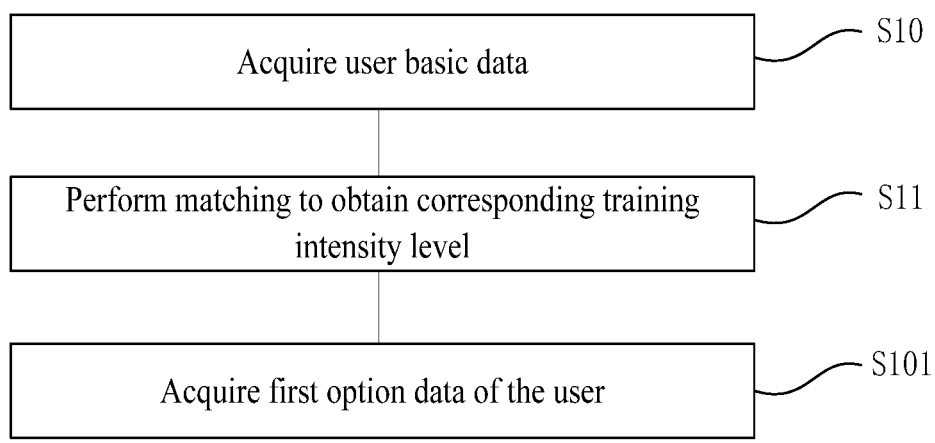
FIG. 3 shows a flowchart of a fitness coaching method according to another embodiment of the present invention.

Alternatively, the above steps only show the steps after the user has made a selection of a workout move, and it should be understood that the fitness coaching method of the present invention further includes the following steps prior to step S101, as shown in FIG. 3:

S10, user basic data is acquired.

Specifically, when the user enters a first-time startup interface, the user may manually input his/her basic data including, for example, sex, age, height, weight, etc.

S11, matching is performed according to the user basic data to obtain a corresponding training intensity level, wherein each intensity level associates with a daily recommended workout routine, and each daily recommended workout routine includes at least one candidate workout move, wherein the workout move is one selected from the candidate workout moves.

Specifically, the training intensity level may be, for example, Level 1, Level 2, Level 3, etc., and also may be beginners, intermediates, advanced, etc. Each intensity level associates with a daily recommended workout routine, for example, take one week as a period, it may include at least 7 days of recommended workout routines. Further, each daily recommended workout routine includes at least one candidate workout move, for example, the workout routine of the first day may include candidate workout moves such as jumping jacks, dumbbell Russian twist, dumbbell step-up, and others, and the difficulty and intensity of the candidate workout moves in the workout routine may gradually increase with training days.

Thereafter, according to the user's own selection, go to step S101, i.e. the step of acquiring the first option data selected by the user for the workout move.

As can be seen from the above, in the fitness coaching method of the present invention, for any workout move that has been previously selected, when the user selects back to the workout move again or next, the set playback speed of the demonstrative data of the workout move is the previous set playback speed by default.

That is, as long as the user used to play the corresponding workout move and tune the set playback speed for the workout move, then no matter whether the user switches to any other workout move (when each daily recommended workout routine includes two or more candidate workout moves), or quits the application program and opens it again, when the workout move is selected again, the demonstrative data can be played at the playback speed previously set by the user, and the rate of counting of the corresponding dynamic count text and the speaking speed of the speech vary synchronously, namely a personalized training guidance which is most suitable for the self-training rhythm of the user is provided according to one or more sets of the user.

Figure 4:
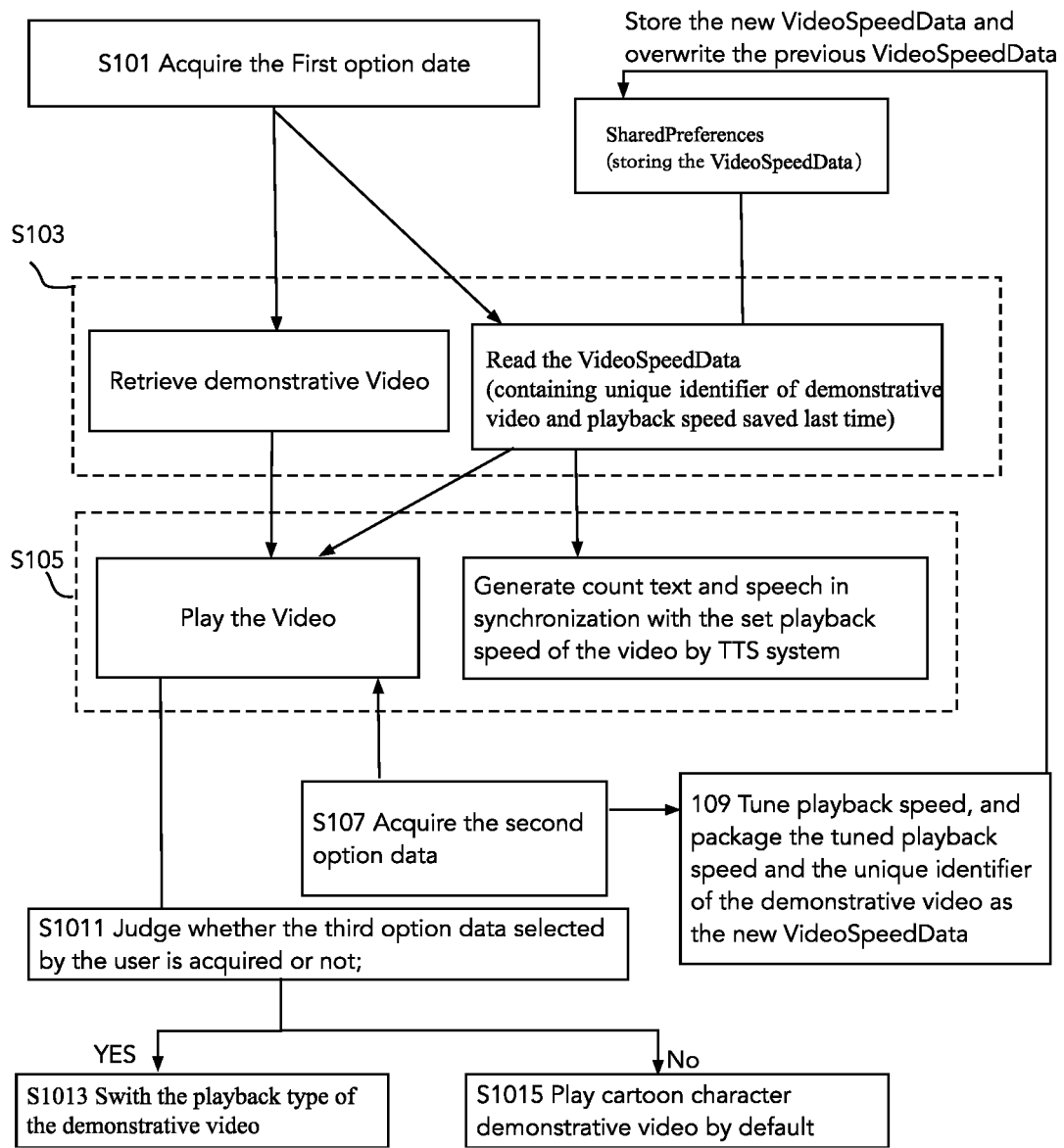
FIG. 4 shows a flowchart of a fitness coaching method according to yet another embodiment of the present invention.

Alternatively, in the fitness coaching method of the present invention, the workout move data retrieved in step S103 includes data of both a cartoon character demonstrative video and a human image video data matching with the workout move, and the user can select a preferred type of the demonstrative video, thereby learning the demonstrative video more effectively. At this time, as shown in FIG. 4, after the step of playing the retrieved demonstrative video (i.e. step S105), the method further includes the following steps:

S1011, whether third option data selected by the user for a video type of the same demonstrative video being played is acquired or not is judged, wherein the third option data indicates whether it is selected to jump from playing the cartoon character demonstrative video to playing the human image video, or jump back from playing the human image video to playing cartoon character demonstrative video; and if so, go to step S103; and if not, go to step S1015.

S1013, in response to the third option data, jump to the selected video type, i.e. jump to playing the human image video, or jump back to playing cartoon character demonstrative video. The embodiment of FIG. 4 is illustrated with the steps as the third option data is acquired as an example.

S1015, if the third option data is not acquired, the cartoon character demonstrative video is played by default.

Figure 5:
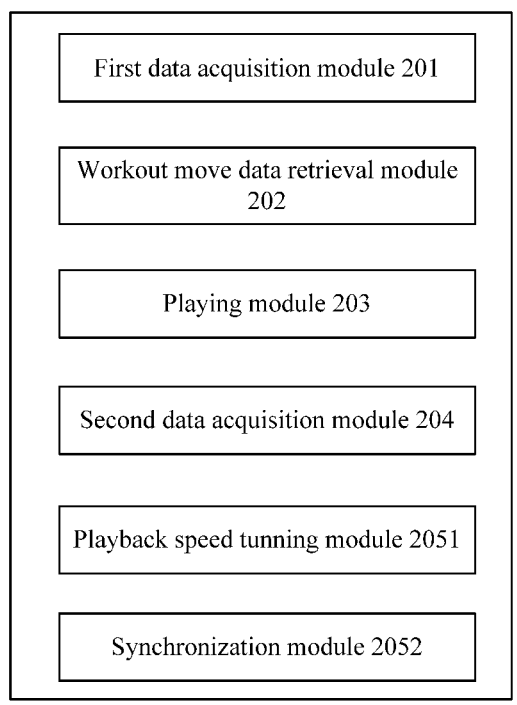
FIG. 5 shows a schematic diagram of a fitness coaching system according to an embodiment of the present invention.
Figure 6:
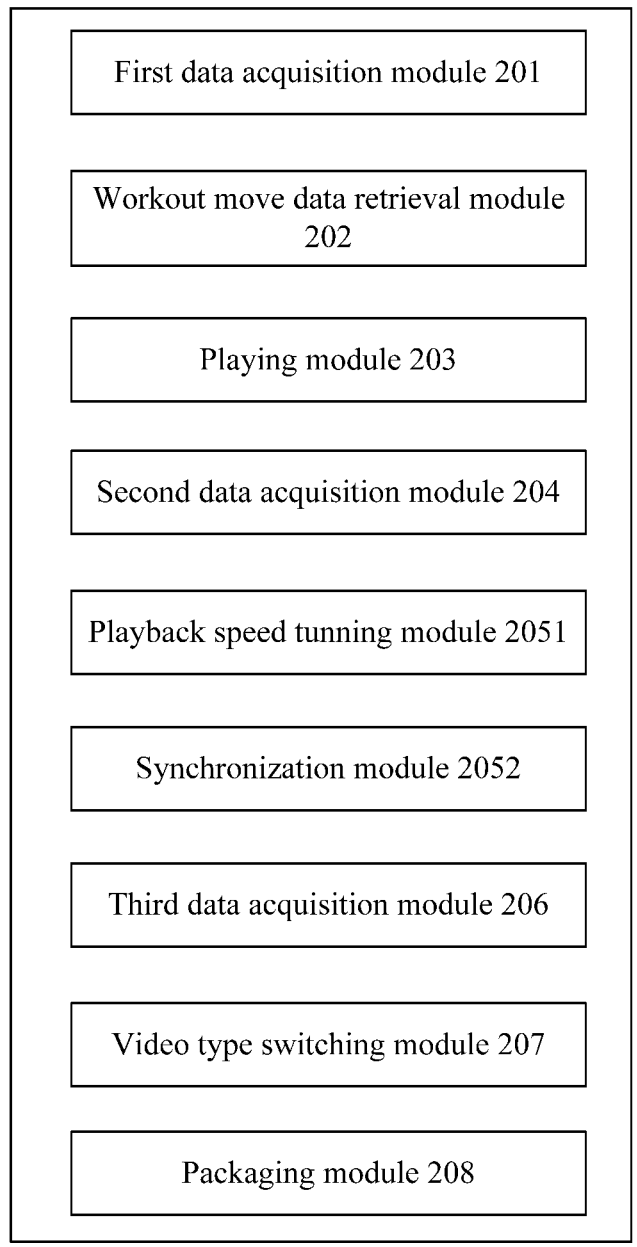
FIG. 6 shows a schematic diagram of a fitness coaching system according to another embodiment of the present invention.

In a second aspect, an embodiment of the present invention provides a fitness coaching system (non-transitory computer readable) applicable to a terminal device for implementing the methods of the above method embodiments; as shown in FIGS. 5 and 6, the system includes:

a first data acquisition module 201 for acquiring first option data selected by a user for a workout move, i.e. for performing step S101 of the afore-mentioned fitness coaching method in the terminal device;

a workout move data retrieving module 202 for, in response to the first option data selected by the user, retrieving a demonstrative video in the system and reading VideoSpeedData in the system according to an unique identifier of the demonstrative video to obtain a set playback speed of the demonstrative video, i.e. for performing step S103 of the afore-mentioned fitness coaching method in the terminal device;

a second data acquisition module 204 for acquiring second option data selected by the user for the set playback speed of the demonstrative video, i.e. for performing step S107 of the afore-mentioned fitness coaching method;

a playback speed tuning module 2051 for, in response to the second option data, tuning the set playback speed of the demonstrative video being played;

a synchronization module 2052 for generating, by a TTS module of the fitness coaching system, count text and speech in synchronization with the set playback speed and keep in consistence with the frequency of movement in the demonstrative video; the playback speed tuning module 2051 and the synchronization module 2052 together for performing step S109 of the afore-mentioned fitness coaching method;

a packaging module 208 for, once the set playback speed of the demonstrative video of any workout move is tuned, packaging the tuned playback speed and the unique identifier of the demonstrative video as Video-SpeedData to be stored in SharedPreferences and overwriting the previous VideoSpeedData such that the tuned playback speed is to be used as the set playback speed corresponding to the demonstrative video when the demonstrative video is selected the next time, i.e. for performing step S105 of the afore-mentioned fitness coaching method; and a playing module 203 for playing the retrieved demonstrative video at the set playback speed, and the synchronous count text and speech, i.e. for performing step S105 of the afore-mentioned fitness coaching method.

According to the present invention, not only is the set speed of playing the video tuned, but also the frequency of counting of the count text displayed in the dynamic count text area and the speaking speed of the corresponding speech vary along with it so as to be displayed in synchronization with the frequency of the workout move in the demonstrative video, so that the user can adjust the rhythm of counting to be better suitable the frequency of the movement the user, thereby achieving user-friendly operation.

In addition, once the playback speed of the demonstrative video of any workout move is tuned, the tuned playback speed setting is used as the playback speed of the demonstrative video when the workout move is selected the next time, thereby achieving more user-friendly and intelligent operation.

It should be noted that the speed tuning options in the playback speed tuning module 2051 are the same as that in the fitness coaching method described above. Preferably, the initial set playback speed is preferably defined as a 1× playback speed, and the second option data for user selection is N times the initial playback speed, wherein N may be one selected from group consisting of 0.5, 0.6, 0.7, 0.8, 0.9, 1.0, 1.1, 1.2, 1.3, 1.4, 1.5, 2, 2.5, 3, 3.5, or 4.

Alternatively, in the fitness coaching system of the present invention, the demonstrative video of the workout move data retrieved by the workout move data retrieving module 202 includes data of both a cartoon character demonstrative video and a human image video data matching with the workout move, and the user can select a preferred type of the demonstrative video, thereby learning the demonstrative video more effectively.

Herein, as shown in FIG. 6, the fitness coaching system of the present invention may further include:

a third data acquisition module 206 for acquiring third option data selected by the user for a video type of the demonstrative video being played, wherein the third option data indicates whether it is selected to jump from playing the cartoon character demonstrative video to playing the human image video, or jump back from playing the human image video to playing cartoon character demonstrative video, i.e. for performing step S1011 of the afore-mentioned fitness coaching method; and a video type switching module 207 for, in response to the third option data, jumping to the selected video type, i.e. for performing step S1013 of the afore-mentioned fitness coaching method.

Figure 7:
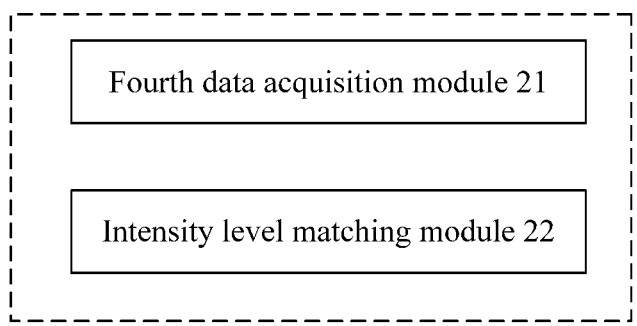
FIG. 7 shows a schematic diagram of a fitness coaching system according to yet another embodiment of the present invention.

Alternatively, as shown in FIG. 7, the fitness coaching system of the present invention further includes:

a fourth data acquisition module 21 for acquiring user basic data, i.e. for performing step S10 of the afore-mentioned fitness coaching method; and an intensity level matching module S11 for performing matching according to the user basic data to obtain a corresponding training intensity level, wherein each intensity level associates with a daily recommended workout routine, and each daily recommended workout routine includes at least one candidate workout move, wherein the workout move is one selected from the candidate workout moves, i.e. for performing step S11 of the afore-mentioned fitness coaching method.

Figure 8:
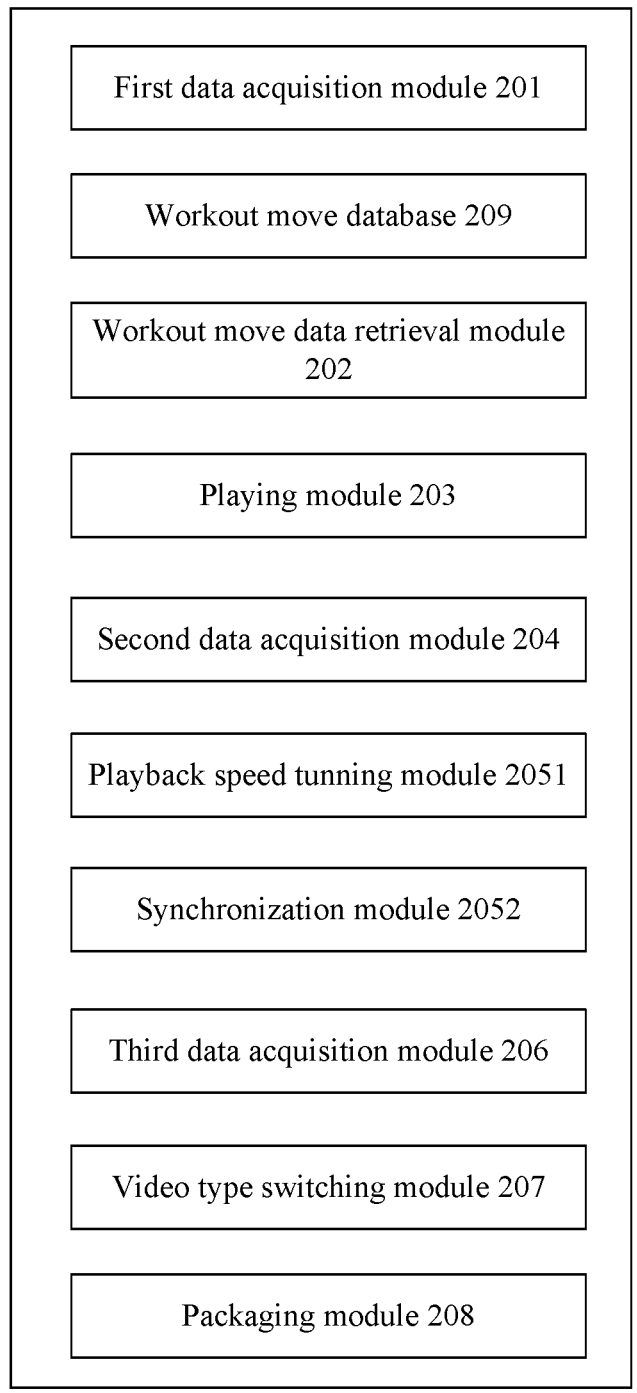
FIG. 8 shows a schematic diagram of a fitness coaching system according to still another embodiment of the present invention.

It will be appreciated that, similar to the fitness coaching method described above, the workout move data in the fitness coaching system of the present invention may be pre-stored in the memory 140 or cached by the user in the memory 140 or retrieved via online transmission. In a preferred embodiment of the present invention, as shown in FIG. 8, since the memory occupied by the animation data is reduced, the cartoon character demonstrative video is preferably pre-stored in the memory 140 when the app is downloaded, and the human image video data is preferably retrieved from a corresponding server via online transmission.

Specifically, the fitness coaching system further includes:

a workout move database 209 for storing demonstrative videos matching with various workout moves, wherein the workout move data retrieving module 202 retrieves the demonstrative video matching with the selected workout move from the workout move database 209.

In a third aspect, an embodiment of the invention provides a fitness coaching terminal. As shown in FIG. 1, the fitness coaching terminal includes a display device 120, an input device 110, a processor 130, and a memory 140 having the above fitness coaching system (i.e. a fitness coaching software program) stored therein.

The display device 120 is used for displaying an interactive interface of the fitness coaching software program; the input device 110 is used for receiving an operation gesture of the user on the fitness coaching software program; the processor 130 is used for executing the fitness coaching software program, responding to the operation gesture received by the input device 110, and generating a corresponding interactive interface displayed in the display device 120.

In the fitness coaching terminal of the present invention, the specific interactive interface of the display device 120 may be adaptively configured as desired. In a preferred embodiment, the interactive interface of the preferred display device includes a first-time startup interface (not shown), a first interface 310, a third interface 330, and a fourth interface 340.

The first-time startup interface is used for collecting user basic data, i.e. corresponding to the fourth data acquisition module 21 of the fitness coaching system.

Figure 9:
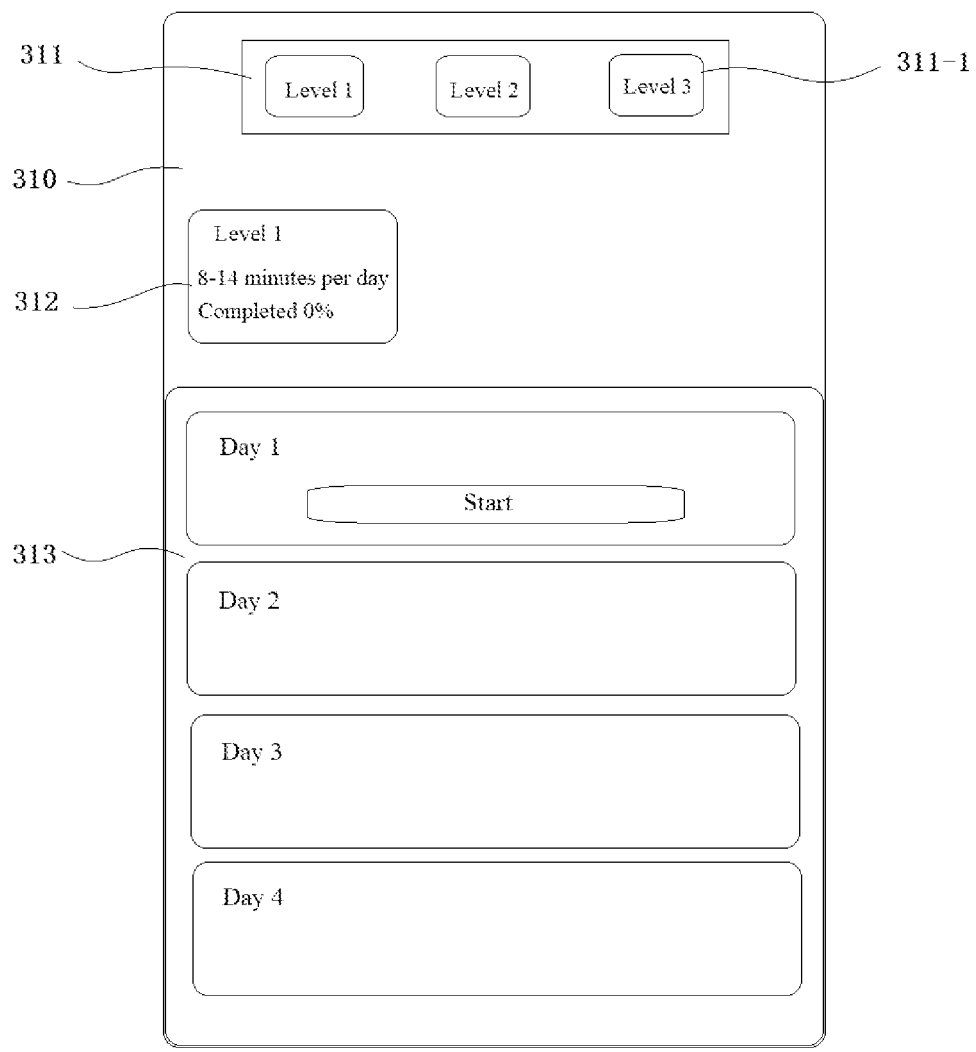
FIG. 9 shows a schematic diagram of a first interface of a fitness coaching terminal according to an embodiment of the present invention.

As shown in FIG. 9, the first interface 310 is used for listing options of recommended workout routines associating with the training intensity level matching with the user basic data.

Specifically, a training level option area 311 is provided at the top of the first interface 310 in which option buttons of different level 311-1 are displayed from left to right.

In the middle of the first interface 310 and at the bottom of the training level option area 311, a current level display area 312 is provided for displaying the currently selected training intensity level, a total daily training time at the intensity level, and a total completed progress of a recommended workout routine at the intensity level.

Under the current level display area 312, a recommended workout routine button display area 313 in terms of days (the period may be one week or one month or other number of days) is provided, and a plurality of recommended workout routines are sequentially arranged from top to bottom for user selection. It should to be noted that in order to display not only the recommended workout routines, but also text descriptions of each recommended workout routine, this area can floatingly display four daily recommended workout routines per screen, and other daily recommended workout routines can be conveniently browsed and selected by scrolling up or down the daily recommended workout routines one by one.

Figure 10:
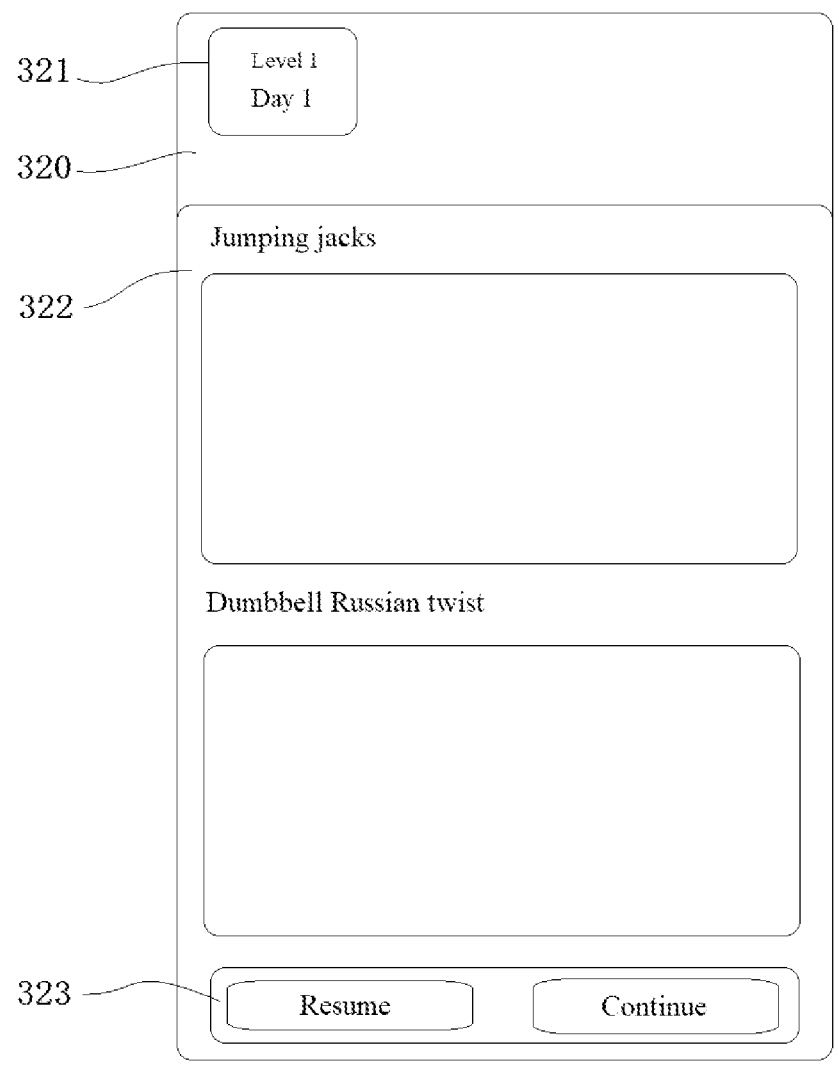
FIG. 10 shows a schematic diagram of a second interface of a fitness coaching terminal according to an embodiment of the present invention.

As shown in FIG. 10, the second interface 320 is used for listing options of the workout moves included in the recommended workout routine selected by the user Specifically, a training level and time display area 321 is provided at the top of the second interface 320 for displaying the currently selected training level (e.g., Level 1) and the particular time of progress (e.g., Day 1) of the selected recommended workout routine at that training level.

A workout move option area 322 is provided in the second interface 320 below the training level and time display area 321, and a plurality of candidate workout move items are sequentially arranged and displayed from top to bottom in the workout move option area 322 so that the user can select which workout move to start training according to own preferences. Similarly, other candidate workout moves in the recommended workout routine can be browsed and selected by scrolling up or down the candidate workout move items one by one.

In addition, at the bottom of the second interface 320, a selection function area 323 is provided, and for a workout move selected for the first time on the current day, a start button (not shown in the figure) is provided in the first selection function area 323. For a workout move that has been selected on the current day, with a resume button and a continue button are provided in the selection function area 323 to facilitate user selection.

The third interface includes a first workout move playing area 331, a playback speed tunning trigger area 333, and a dynamic count text area independent of the first workout move playing area 332.

Figure 11:
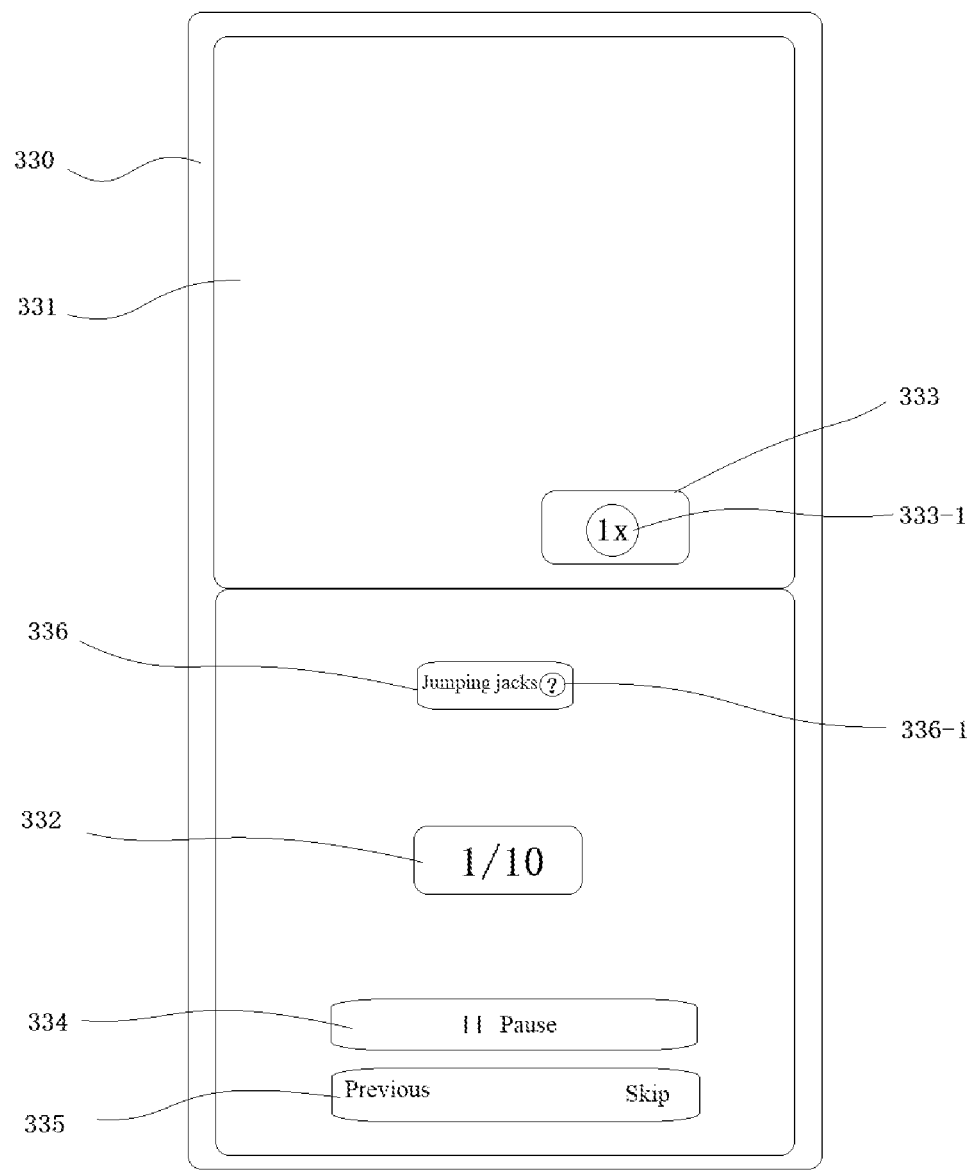
FIG. 11 shows a schematic diagram of a third interface of a fitness coaching terminal according to an embodiment of the present invention.

For example, as shown in FIG. 11, the third interface 330 may include a first workout move playing area 331 at the top, a dynamic count text area 332 at the bottom, and a playback speed tunning trigger area 333 in the middle.

The first workout move playing area 331 is used for playing the demonstrative video and the content of the speech of the workout move selected by the user. The dynamic count text area 332 is used for dynamically displaying the count text content corresponding to the workout move, for example, a total of 10 repetitions, and the 10 repetitions are sequentially displayed as 1/10, 2/10, . . . , 10/10. The playback speed tunning trigger area 333 is used for displaying a playback speed tunning trigger button 333-1, and can display the current set playback speed in real time, for example, 1×, 0.8×, etc., so as to conveniently prompt the user of the current speed.

In addition, in the third interface 330, a second selection function area 334 is further provided, and a pause button and a resume play button are provided, wherein only the pause button is displayed during play and only the resume play button is displayed during pause.

Alternatively, at the bottom of the second selection function area 334, a workout move fast switching area 335 may also be provided, and a workout move switching button and a skip button are provided; the workout move switching button is used for switching from the current workout move to the previous workout move; and the skip button is used for switching from the current workout move to the next workout move without waiting to complete the preset number of repetitions, thereby improving the autonomy and the flexibility of training.

It should be noted that a preparation interface (not shown) may also be provided between when the user selects a corresponding workout move in the selection function area 323 of the second interface 320 and when it enters the third interface 330. The preparation interface is substantially similar to the third interface 330, and only differs by having no playback speed tunning trigger area. In addition, when animation data in the preparation interface is automatically played once, it is automatically switched from the interface to the third interface 330. The purpose of providing the preparation interface is to allow the user to preview the content of the workout move in advance before formal training, and provide some buffer time, thereby providing better user experience. The functions of various areas in the preparation interface will not be described again.

Figure 12:
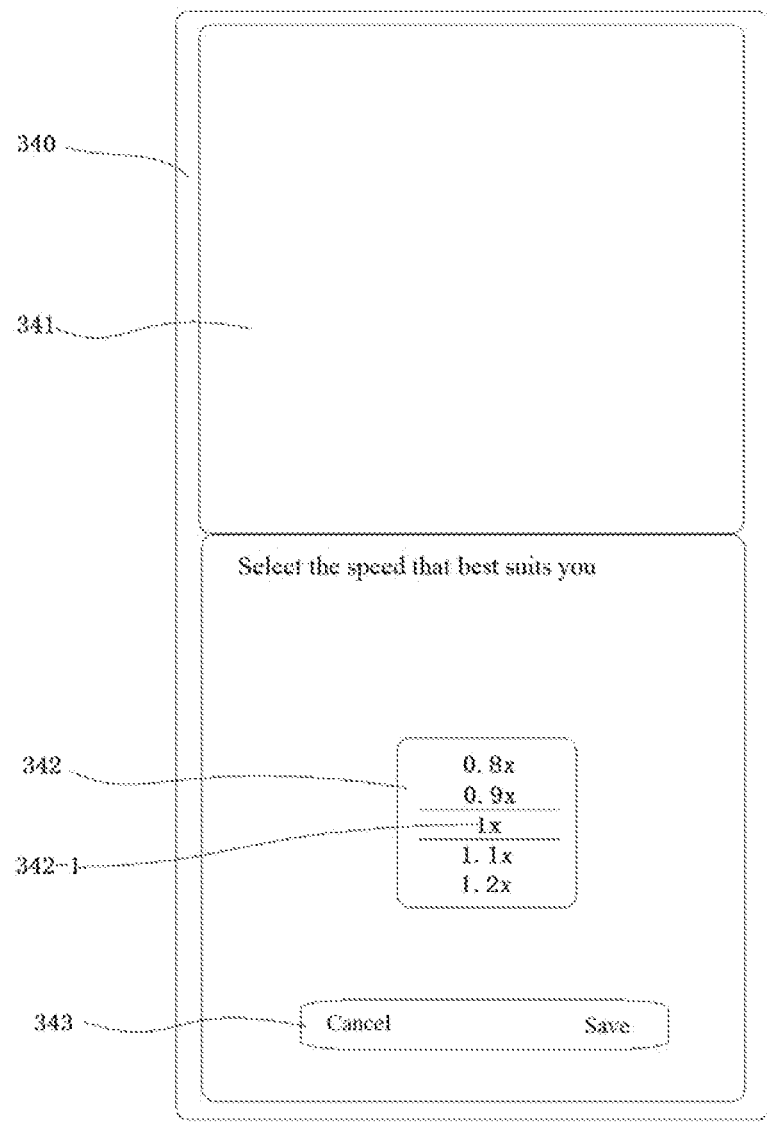
FIG. 12 shows a schematic diagram of a fourth interface of a fitness coaching terminal according to an embodiment of the present invention.

The third interface 320 is configured to switch to the fourth interface 340 when the playback speed tunning trigger button 333-1 displayed in the playback speed tunning trigger area 333 is triggered. As shown in FIG. 12, the fourth interface 340 includes a second workout move playing area 341 and a playback speed tunning area 342. The location of the second workout move playing area 341 is the same as the location of the first workout move playing area 331 in the third interface 330, and when it switches to the fourth interface, the demonstrative video played in the first workout move playing area 331 of the third interface is synchronously switched to the second workout move playing area 341 to continue the play.

The playback speed tunning area 342 is independent of the second workout move playing area 341 and is used for displaying a playback speed tunning selection button 342-1 and a playback speed option; and the preferred playback speed tunning area 342 is configured to be scrolled up or down to display different playback speed options. Specifically, as described in the above fitness coaching method and device, the initial playback speed is defined as 1 time playback speed, and the playback speed options are 0.5, 0.6, 0.7, 0.8, 0.9, 1.0, 1.1, 1.2, 1.3, 1.4, 1.5, 2, 2.5, 3, 3.5, or 4 times the initial playback speed, and are displayed as 0.5×, 0.6×, 0.7×, 0.8×, 0.9×, 1×, 1.1×, 1.2×, 1.3×, 1.4×, 1.5×, 2×, 2.5×, 3×, 3.5× and 4×.

Further, the fourth interface 340 is configured such that, when the playback speed selection button 342-1 is triggered, the playback speed of the demonstrative video and the content of the speech in the second workout move playing area 341 is tuned in real time according to the change of the selected playback speed, and the user can get the tuned playback speed visually while tuning the playback speed tunning selection button so as to select an appropriate playback speed.

In addition, at the bottom of the fourth interface 340, a third selection function area 343 may be further included, and a save button and a cancel button are provided, wherein the save button is used for confirming and saving the selected playback speed option; the cancel button is used to cancel the playback speed selected by the user. Moreover, no matter whether the save button or the cancel button is selected, it returns to the third interface 330.

According to the fitness coaching terminal, for the first to fourth interfaces, the operation gestures received by the input device 110 may include:

- a first gesture for selecting a daily recommended workout routine in the daily recommended workout routine button display area 313 of the first interface 310, and entering the second interface 320;
- a second gesture for selecting a corresponding candidate workout move in the candidate workout move option area 322 of the second interface 320 as the workout move, and entering the third interface 330 after selection is confirmed;
- a third gesture for triggering the playback speed tunning trigger button 333-1 in the playback speed tunning trigger area 333 of the third interface 330, and entering the fourth interface 340 after selection is confirmed; and
- a fourth gesture for selecting a corresponding playback speed option button 342-1 in the playback speed tunning area 342 of the fourth interface 340, and returning to the third interface 330 after selection is confirmed.

Alternatively, in the fitness coaching system of the present invention, as shown in FIG. 11, the third interface 330 further includes a video type selection trigger area 336; wherein the video type selection trigger area 336 is used for displaying a video type selection trigger button 336-1. Accordingly, it enters the fifth interface 350 after the video type selection trigger button 336-1 is triggered.

Figure 13:
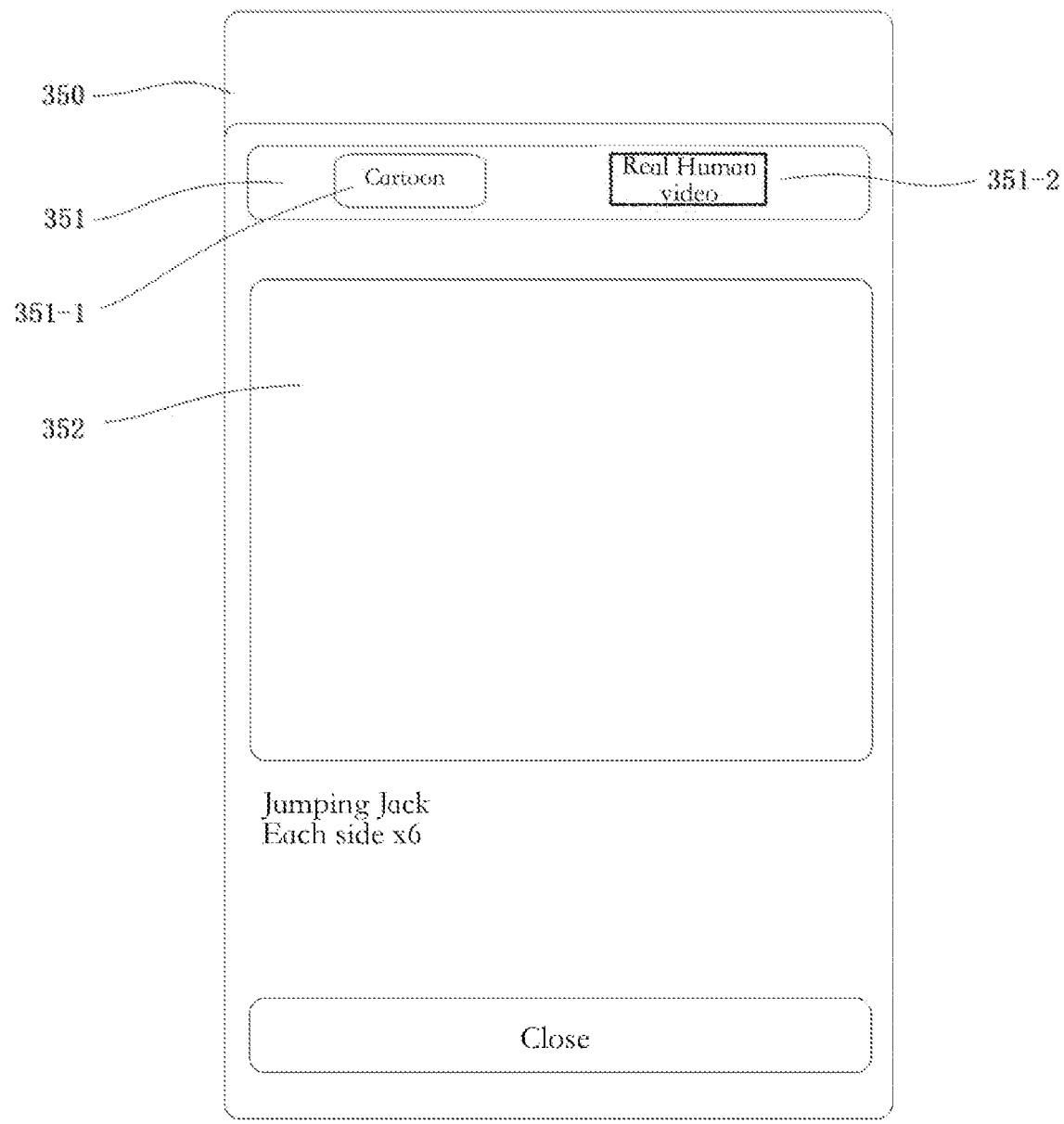
FIG. 13 shows a schematic diagram of a fifth interface of a fitness coaching terminal disclosed in an embodiment of the present invention.

Specifically, as shown in FIG. 13, the fifth interface 350 includes a video type option area 351 and a third workout move playing area 352; wherein the video type selection area 351 is used for displaying a cartoon video playing button 351-1 and a human video playing button 351-2, and the third workout move playing area 352 is used for displaying the demonstrative video and the content of the speech of the corresponding video type according to a selection gesture received by the video type selection area 351.

Accordingly, the operation gesture received by the input device 110 may include:

- a fifth gesture for triggering a video type selection trigger button 336-1 in the third interface 330, and entering the fifth interface 350; and
- A sixth gesture for triggering an animation play button 351-1 and a video data button 351-2 in the fifth interface 350 to switch to the corresponding video type.

It should be noted that some of the interfaces defined in the present invention, such as the first interface, the second interface, the third interface, the fourth interface, and the fifth interface, may be completely displayed in one screen of the display screen of the display device, while others may not, include portions that need to be completely displayed by sliding up, down, left, or right.

In addition, in the above-described embodiments of the present invention, only the main function areas and function buttons included in each interface are described, and it will be understood that in other preferred embodiments, other currently known function areas and function buttons may be included in each interface, such as a text annotation area for interpreting a workout move, a comment area for evaluating (through "like") the workout move bein played, etc., which are not listed again.

Those skilled in the art will appreciate that the elements, algorithms, and method steps described in connection with the embodiments disclosed herein may be implemented as a combination of computer software and electronic hardware. Whether such functionality is implemented as hardware or software depends upon the particular application and design constraints imposed on the particular implementation. Skilled artisans may implement the described functionality in varying ways for each particular application, but such implementation should not be interpreted as causing a departure from the scope of the present invention.

What is claimed is:

1. A fitness coaching method provided via a user intelligent terminal, wherein the user intelligent terminal comprises a fitness coaching system installed in the user intelligent terminal, and the fitness coaching method comprises:

acquiring first option data selected by the user for a workout move, wherein the first option data refers to a workout move option of interest;

retrieving, by the user intelligent terminal and based on the first option data selected by the user, a demonstrative video associated with the workout move and obtaining a set playback speed of the demonstrative video by reading VideoSpeedData in the fitness coaching system according to a unique identifier of the demonstrative video;

playing, by the user intelligent terminal, the demonstrative video at the set playback speed, and simultaneously generating, by the fitness coaching system, a count text and a speech in synchronization with the demonstrative video playing at the set playback speed; wherein if the demonstrative video of the workout move is retrieved for a first time, the set playback speed is an initial playback speed;

judging, by the user intelligent terminal, whether second option data selected by the user for the set playback speed of the demonstrative video being played is acquired or not, and when the second option data selected by the user for the set playback speed of the demonstrative video being played is acquired, tuning, by the user intelligent terminal, the set playback speed of the demonstrative video being played based on the second option data, packaging, by the user intelligent terminal, the tuned playback speed and the unique identifier of the demonstrative video as VideoSpeedData, and storing, by the user intelligent terminal, the VideoSpeedData in SharedPreferences in the fitness coaching system and overwriting a previous VideoSpeedData of the demonstrative video such that the tuned playback speed is to be used as the set playback speed corresponding to the demonstrative video when the demonstrative video is retrieved in next time.

2. The fitness coaching method according to claim 1, wherein prior to the acquiring of the first option data selected by the user for the workout move, the fitness coaching method further comprises:

acquiring user basic data; and performing a matching according to the user basic data to obtain a corresponding training intensity level, wherein the corresponding training intensity level associates with a daily recommended workout routine, and the daily recommended workout routine comprises at least one candidate workout move, wherein the workout move is one selected from the at least one candidate workout move.

3. The fitness coaching method according to claim 1, wherein the demonstrative video comprises data of both a cartoon character demonstrative video and a real human image video matching with the workout move, wherein after the playing of the demonstrative video at the set playback speed, the fitness coaching method further comprises:

judging whether third option data selected by the user for a video type of the demonstrative video being played is acquired or not;

if the third option data selected by the user for a video type of the demonstrative video being played is acquired, jumping to a selected video type, wherein the third option data indicates whether the third option data is selected to jump from playing the cartoon character demonstrative video to playing the real human image video, or jump back from playing the real human image video to playing the cartoon character demonstrative video; and if the third option data selected by the user for a video type of the demonstrative video being played is not acquired, playing the cartoon character demonstrative video by default.

4. The fitness coaching method according to claim 3, wherein in the second option data, available options for the set playback speed comprise 0.5, 0.6, 0.7, 0.8, 0.9, 1.0, 1.1, 1.2, 1.3, 1.4, 1.5, 2, 2.5, 3, 3.5 and 4 times the initial playback speed.

5. A non-transitory computer readable medium storing computer readable instructions, wherein when the computer readable instructions are executed by a processor, the computer readable instructions form a fitness coaching system and cause the processor to:

acquire first option data selected by a user for a workout move, wherein the first option data refers to a workout move option of interest;

in response to the first option data selected by the user, retrieve a demonstrative video associated with the workout move in the fitness coaching system and reading a previous VideoSpeedData in the fitness coaching system according to a unique identifier of the demonstrative video to obtain a set playback speed of the demonstrative video;

playing the demonstrative video at the set playback speed, and simultaneously generating, by the fitness coaching system, a count text and a speech in synchronization with the demonstrative video playing at the set playback speed; wherein if the demonstrative video of the workout move is retrieved for a first time, the set playback speed is an initial playback speed;

acquire second option data selected by the user for the set playback speed of the demonstrative video;

in response to the second option data, tune the set playback speed of the demonstrative video being played;

a count text and a speech in synchronization with the set playback speed; and once the set playback speed of the demonstrative video of the workout move is tuned, package a tuned playback speed and the unique identifier of the demonstrative video as VideoSpeedData to be stored in SharedPreferences and overwrite a previous VideoSpeedData of the demonstrative video such that the tuned playback speed is to be used as the set playback speed corresponding to the demonstrative video when the demonstrative video is retrieved in next time.

6. The non-transitory computer readable medium according to claim 5, wherein the demonstrative video comprises data of both a cartoon character demonstrative video and a human image video matching with the workout move, and the computer readable instructions further cause the processor to:

acquire third option data selected by the user for a video type of the demonstrative video being played, wherein the third option data indicates whether the third option data is selected to jump from playing the cartoon character demonstrative video to playing the human image video, or jump back from playing the human image video to playing the cartoon character demonstrative video; and in response to the third option data, jump to a selected video type, and set the cartoon demonstrative video as a default video type for playback when the third option data is not acquired.

7. The non-transitory computer readable medium according to claim 5, wherein the computer readable instructions further cause the processor to:

acquire user basic data;

perform matching according to the user basic data to obtain a corresponding training intensity level, wherein the corresponding training intensity level associates with a recommended workout routine, and the recommended workout routine comprises at least one workout move.

8. The non-transitory computer readable medium according to claim 5, further comprising:

a workout move database for storing demonstrative videos of various workout moves, wherein the demonstrative video matching with a selected workout move is retrieved from the workout move database.

9. The non-transitory computer readable medium according to claim 5, wherein in the second option data, available options for the set playback speed comprise 0.5, 0.6, 0.7, 0.8, 0.9, 1.0, 1.1, 1.2, 1.3, 1.4, 1.5, 2, 2.5, 3, 3.5 and 4 times the initial playback speed.

10. A fitness coaching terminal, comprising a display device, an input device, a processor, and the non-transitory computer readable medium according to claim 5;

the display device is used for displaying an interactive interface of the fitness coaching system;

the input device is used for receiving an operation gesture of the user on the fitness coaching system;

the processor is used for executing the fitness coaching system, responding to the operation gesture received by the input device, and generating a corresponding interactive interface displayed in the display device;

the interactive interface comprises:

a first-time startup interface for collecting user basic data;

a first interface for listing options of recommended workout routines associating with a training intensity level matching with the user basic data;

a second interface for listing options of the workout moves included in the recommended workout routines selected by the user;

a third interface comprising a first workout move playing area, a playback speed tuning trigger area, and a dynamic count text area independent of the first workout move playing area, wherein the first workout move playing area is used for playing the demonstrative video and a content of the speech of the workout move selected by the user, wherein the content of the speech contains information about a number of repetitions of the workout move in the demonstrative video;

the dynamic count text area is used for dynamically displaying a number of completed repetitions of the workout move has been done in the demonstrative video in a form of the count text;

the playback speed tuning trigger area is used for displaying a playback speed tuning trigger button and a current playback speed; and when the playback speed tuning trigger button is triggered, the playback speed tuning trigger button is switched to a fourth interface;

the fourth interface comprises a second workout move playing area and a playback speed tuning area;

the playback speed tuning area is used for displaying a playback speed tuning selection button and playback speed options;

when one of the playback speed options is selected by the user, the playback speed tuning selection button is switched back to the third interface, and a selected playback speed option enables the playback speed of the first workout move playing area to be tuned to a target speed, and enables a frequency of counting in a corresponding dynamic count text area and a speaking speed of the speech to vary synchronously.

11. The fitness coaching terminal according to claim 10, wherein the operation gesture received by the input device comprises:

a first gesture for selecting a corresponding daily recommended workout routine in the first interface, and entering the second interface;

a second gesture for selecting a corresponding workout move in the second interface as the workout move, and entering the third interface;

a third gesture for triggering the playback speed tuning trigger button in the third interface, and entering the fourth interface; and a fourth gesture for selecting a corresponding playback speed option button in the fourth interface and returning to the third interface after selection is confirmed.

12. The fitness coaching terminal according to claim 11, wherein the third interface further comprises a video type selection trigger area for displaying a playing mode selection trigger button; and the interactive interface of the display device further comprises:

a fifth interface comprising a video type option area and a third workout move playing area, wherein the video type option area is used for displaying a cartoon video button and a human video button, and the third workout move playing area is used for, according to a selection gesture received in the video type option area, displaying the demonstrative video and the content of the speech of a corresponding video type;

a fifth gesture for triggering a video type selection trigger button in the third interface, and entering the fifth interface; and a sixth gesture for triggering an animation playing button or a video data button in the fifth interface to switch to the corresponding video type.

13. The fitness coaching terminal according to claim 10, wherein the demonstrative video comprises data of both a cartoon character demonstrative video and a human image video matching with the workout move, and the computer readable instructions further cause the processor to:

acquire third option data selected by the user for a video type of the demonstrative video being played, wherein the third option data indicates whether the third option data is selected to jump from playing the cartoon character demonstrative video to playing the human image video, or jump back from playing the human image video to playing the cartoon character demonstrative video; and in response to the third option data, jump to a selected video type, and set the cartoon demonstrative video as a default video type for playback when the third option data is not acquired.

14. The fitness coaching terminal according to claim 10, wherein the computer readable instructions further cause the processor to:

acquire user basic data;

perform matching according to the user basic data to obtain a corresponding training intensity level, wherein the corresponding training intensity level associates with the recommended workout routine, and the recommended workout routine comprises at least one workout move.

15. The fitness coaching terminal according to claim 10, wherein the non-transitory computer readable medium further comprising:

a workout move database for storing demonstrative videos of various workout moves, wherein the demonstrative video matching with a selected workout move is retrieved from the workout move database.

16. The fitness coaching terminal according to claim 10, wherein in the second option data, available options for the set playback speed comprise 0.5, 0.6, 0.7, 0.8, 0.9, 1.0, 1.1, 1.2, 1.3, 1.4, 1.5, 2, 2.5, 3, 3.5 and 4 times the initial playback speed.

* * * * *